United States Patent [19]

Kim

[11] Patent Number: 5,649,053

[45] Date of Patent: Jul. 15, 1997

[54] METHOD FOR ENCODING AUDIO SIGNALS

[75] Inventor: Sang-Wook Kim, Seoul, Rep. of Korea

[73] Assignee: Samsung Electronics Co., Ltd., Rep. of Korea

[21] Appl. No.: 275,452

[22] Filed: Jul. 15, 1994

[51] Int. Cl.$^6$ .................................. G10L 3/02; G10L 9/00
[52] U.S. Cl. ................... 395/2.38; 395/2.39; 395/2.91
[58] Field of Search ........................... 395/2.38, 2.1,
 395/2.39, 2.35, 2; 381/31, 29, 36, 37, 30,
 47; 375/243; 395/2.91, 2.92

[56] References Cited

U.S. PATENT DOCUMENTS

| | | | |
|---|---|---|---|
| 4,956,871 | 9/1990 | Swaminathan | 381/31 |
| 5,014,318 | 5/1991 | Schott et al. | 381/47 |
| 5,185,800 | 2/1993 | Mahieux | 381/29 |
| 5,285,498 | 2/1994 | Johnston | 381/2 |
| 5,301,205 | 4/1994 | Tsutsui | 375/1 |
| 5,301,255 | 4/1994 | Nagai et al. | 395/2.39 |
| 5,341,457 | 8/1994 | Hall, II et al. | 395/2.35 |
| 5,375,189 | 12/1994 | Tsutsui | 395/2.38 |
| 5,381,143 | 1/1995 | Shimoyoshi et al. | 341/51 |
| 5,469,474 | 11/1995 | Kitabatake | 375/243 |

OTHER PUBLICATIONS

D. Seitzer et al, "DSP based real time implementation of an advanced analysis tool for audio channels", ICASSP '89, 2057–2060.

Anthony C. Koch and Michael P. Beddoes, "Analysis of Subband Quantization Noise Levels and Shapes", IEEE '1993, pp. 285–288.

Gerhard Stoll et al, "High Quality Audio Bit–Rate Reduction System Family For Different Applications", Communications, 1990 IEEE International Conference, pp.937–941.

Do–Hui Teh et al., "Subband Coding of High–Fidelity Quality Audio Signals at 128 KBPS," ICASSP–92 $S_2$ ANU, vol. 2, Mar, 23–26, 1992, pp. II–197 –II–200.

"3–C.1.5 Encoding –3–C.1.5.1 Layer I Encoding," Coding of Moving Pictures & Associated Audio for Digital Storage Media at up to About 1.5 MBIT/s, Part 3 Audio, Jun. 11, 1992, pp. C–5 to C–6, C–9 to C–10.

*Primary Examiner*—Ayaz R. Sheikh
*Assistant Examiner*—Patrick N. Edward
*Attorney, Agent, or Firm*—Rothwell, Figg, Ernst & Kurz, P.C.

[57] ABSTRACT

In allocating the number of quantization bits in a method for encoding audio signal using the characteristics of human auditory system, the encoding method improves operation speed by allocating quantization bits sequentially from highest frequency bands to lowest frequency bands, thereby enabling non-iterative operation, which reduces the number of operations.

4 Claims, 5 Drawing Sheets

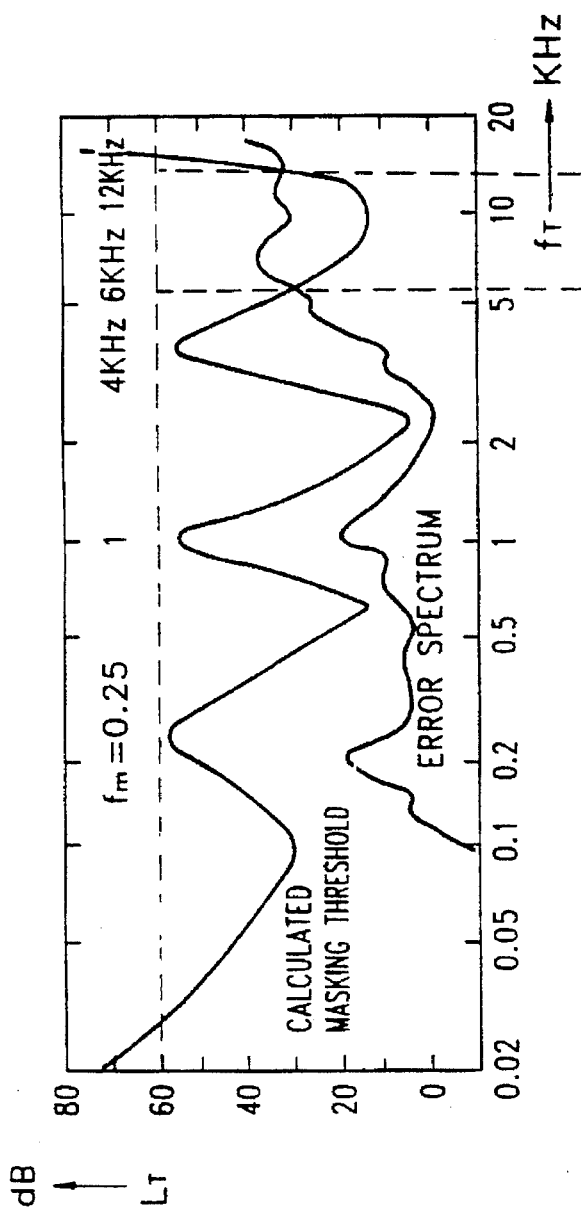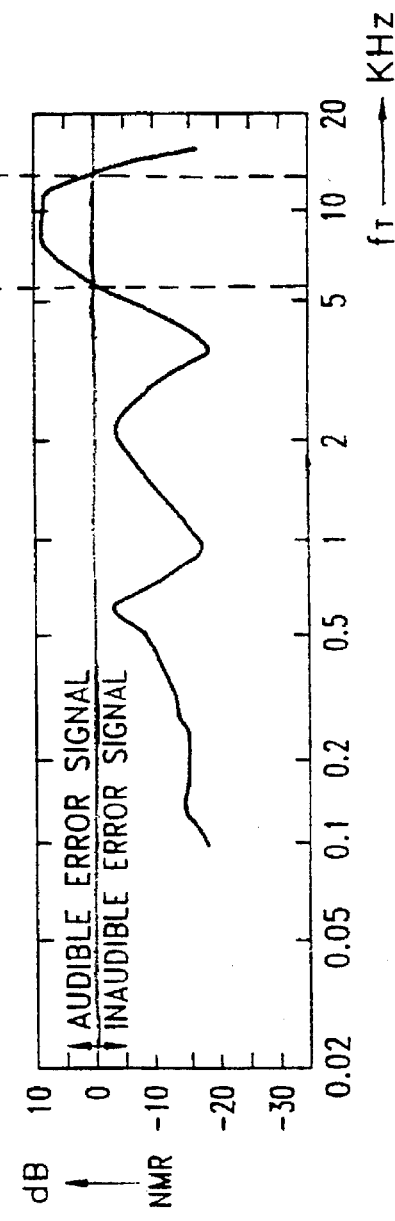
FIG. 4A
PRIOR ART
FIG. 4B
PRIOR ART

METHOD FOR ENCODING AUDIO SIGNALS

BACKGROUND OF THE INVENTION

The present invention relates to a method for encoding audio signals using human auditory characteristics, and more particularly, to an encoding method for improving the speed of bit allocating operation.

Along with the recent development of digital signal processing technology, existing audio instrumentation is undergoing rapid replacement. That is, laser disk players (LDPs) or tape recorders for recording/reproducing analog audio signals are being supplanted with the systems adopting compact disks (CDs), digital audio tapes (DATs) or MiniDiscs (MDs) for recording/reproducing digital audio signals. Here, the digital processing of an audio signal improves sound quality, but results in the adverse effect of greatly increasing data quantity.

The above data-quantity problem can be alleviated by selectively removing signal components which are undetectable by the human ear and adaptively allocating a number of quantization bits to those components which can be perceived. This is accomplished by digital compact cassettes, MiniDiscs, or an MPEG (Moving Pictures Expert Group) audio system whose standardization has been recently set by the International Organization for Standardization. The main objective of such an encoding method is not removing generated noise but processing the noise not so as to be perceived, by adaptively allocating the number of quantization bits according to signal weight in consideration of a masking effect and critical bands. Here, the masking effect is a phenomenon wherein the sound (audio component) which should be heard is disturbed or masked completely by other sounds, and the critical bands are frequency bands in which signal and noise components cannot be differentiated from each other in frequency domain when their frequency and power characteristics are respectively similar to each other.

In the method of encoding using characteristics of the human auditory system, the encoding is performed in consideration of the aforementioned masking phenomenon. A masking threshold is first obtained. The masking threshold changes due to an interaction between input signals and is the minimum magnitude of a signal which is heard but cannot be discerned. The undiscernible signal is not allocated with quantization bits, but the signal component which is important for the comprehension of the sound is adaptively allocated with a number quantization bits, thereby obtaining a data compression effect.

Various measures have been proposed for locating the signal which plays the determining role in sound perception, using an input signal and the masking threshold of the input signal. The typically employed technique is to obtain a noise-to-mask ratio (NMR) which is the ratio of an error noise component (noise due to an error value based on quantization in each band) to the masking threshold. This noise-to-mask ratio indicates the gap between the masking threshold and the error component.

As can be shown by acoustic experimentation, if noise is present at levels near the masking threshold, the noise is difficult to detect, and if below the masking threshold, detection is impossible. Thus, it is important to know the gap between the error signal and the masking threshold.

The NMR concept was originally adopted in 1987 as one factor for considering the aforementioned characteristic regarding the masking threshold, and indicates the audible extent of the error signal in view of human psychoacoustic properties.

The noise-to-mask ratio is determined by obtaining the signal-to-mask ratio (SMR) and performing a relational operation of the obtained SMR value and an SNR value which is the ratio of a quantized error signal to the error noise.

The method of allocating the number of quantization bits with respect to perceivable sound components is described below, in terms of a conventional encoding method.

1. The number of bits allocated to all critical bands is initialized (set to zero) and NMR values are computed for all critical bands.

2. The critical band having the largest NMR value is searched, and one bit is allocated to the searched critical band.

3. The NMR values for all critical bands are computed newly, and step 2 is repeated until all the available quantization bits are depleted.

According to the aforementioned conventional bit allocation method, after performing relational operations a certain number of times (the number of processed bands minus one) when one bit is allocated, an addition operation is further required. For example, if the number of critical bands is twenty four, in order for N quantization bits to be allocated for a given band, N(24−1) relational operations and N addition operations are required. Therefore, with such an iterative bit-allocation method, manifold operations are needed, which thus complicates the hardware configuration.

SUMMARY OF THE INVENTION

Therefore, it is an object to provide an encoding method considering the characteristics of the human auditory system, for reducing the number of operations for a bit allocation.

To accomplish the above object, the encoding method according to the present invention comprises the steps of:

sampling a time-domain audio signal;

converting the sampled audio signal into a frequency-domain signal divided into a plurality of critical bands;

allocating to each critical band the number of quantization bits which allows the minimum noise-to-mask ratio (NMR) for the corresponding critical band; and quantizing the frequency-domain signal by the allocated number of quantization bits, wherein, in the bit allocating step, the quantization bits are allocated according to the weight of a critical band, from the critical band having the highest frequency to the one having the lowest frequency.

In the encoding method according to present invention, since the quantization bits are allocated sequentially starting with the highest critical band, many more quantization bits are allocated in the lower bands than in the higher bands. Also, only the signal-to-mask ratio is considered, without regard to the NMR value, in allocating the quantization bits, thereby enabling a reduction in the operational complexity.

BRIEF DESCRIPTION OF THE DRAWINGS

The above objects and advantages of the present invention will become more apparent by describing in detail a preferred embodiment thereof with reference to the attached drawings in which:

FIGS. 4A and 4B illustrate the relationship between masking threshold and error noise, and the relationship between NMR value and error noise, respectively.

DETAILED DESCRIPTION OF THE INVENTION

Figure 1:
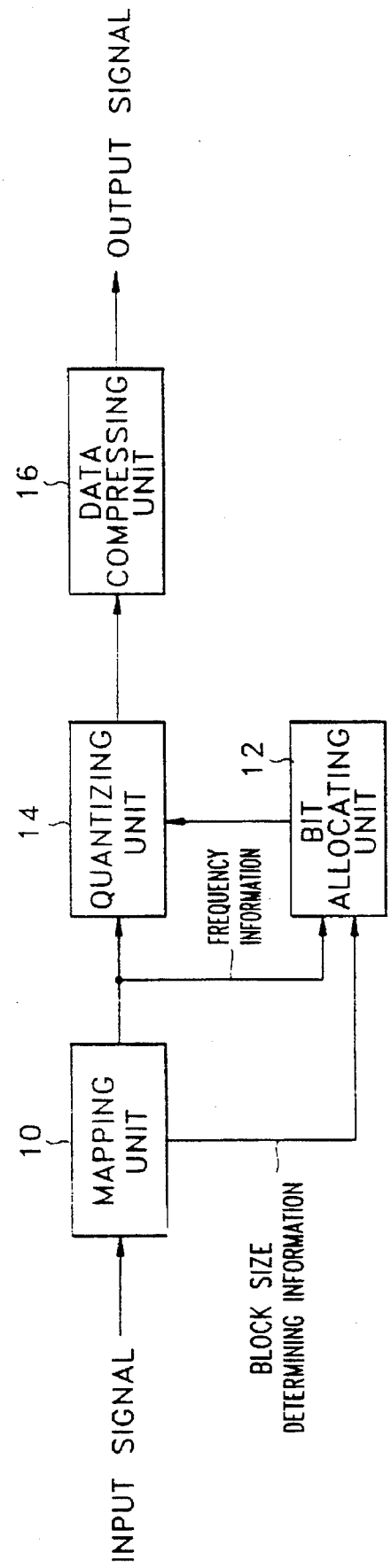
FIG. 1 is a block diagram of an encoder which makes use of the characteristics of the human auditory system.

FIG. 1 is a block diagram showing the general configuration of the audio system adopting an encoding method considering human auditory characteristics. The apparatus shown in FIG. 1 includes a mapping unit 10 for sampling a time-domain audio signal by blocks of a predetermined size and converting the sampled signal into a frequency-domain signal divided into critical bands and outputting the converted signal, a bit allocating unit 12 for determining the number of quantization bits of the frequency-domain signal divided into the respective critical bands, a quantizing unit 14 for quantizing the frequency-domain signal according to the allocated number of quantization bits, and a data compressing unit 16 for data-compressing the quantized frequency-domain signal and outputting the compressed signal.

The mapping unit 10 converts the input signal into the frequency domain signal in order to perform an encoding operation considering human auditory characteristics, divides the signal into critical bands, and outputs.

The bit allocating unit 12 adaptively allocates the number of quantization bits of the respective critical bands according to the masking phenomenon generated by the interaction between the input signal magnitude and critical bands. That is to say, the quantization bits are not allocated to the portion not being perceived by the ear, and the quantization bits are allocated to the important portion depending on the weight. A noise-to-mask ratio (NMR) depending on mask levels and quantization is adopted as the basis for determining the weight of input signals.

The quantizing unit 14 quantizes the frequency-domain signal according to the number of quantization bits allocated by the bit allocating unit 12, and performs linear or nonlinear quantization depending on the signal transmission characteristics, so that the error generated upon signal restoration is minimized. Also, the quantizing unit 14 adopts a feed-back or feed-forward adaptive quantization method in order to realize optimal quantization according to the given number of quantization bits. In a digital audio system adopting encoding method considering human auditory characteristics, its sound quality improvement is mostly attained by adjusting quantization steps and quantization noise magnitudes using the feed-forward adaptive quantization method.

The extent of audio signal sensing depends on the power distribution and frequency distribution characteristics of the input signal, for a given quantizing apparatus. This means that error signal has a constant distribution structure determined by human auditory characteristics instead of a random distribution, by which the SNR value, having been used as an objective evaluation value of an applied audio signal, exhibits a little correlation with an acoustic experiment which is a subjective evaluation. By acoustic experimentation, it has been shown that noise near the masking threshold is hard to detect and impossible to detect when below the masking threshold. Thus, it is important to know the gap between the error noise and the masking threshold in the encoding using human auditory characteristics.

Generally, the transmission of audio information is a function of the time elapsed. The masking effect is also generated according to the elapsed time.

Figure 2:
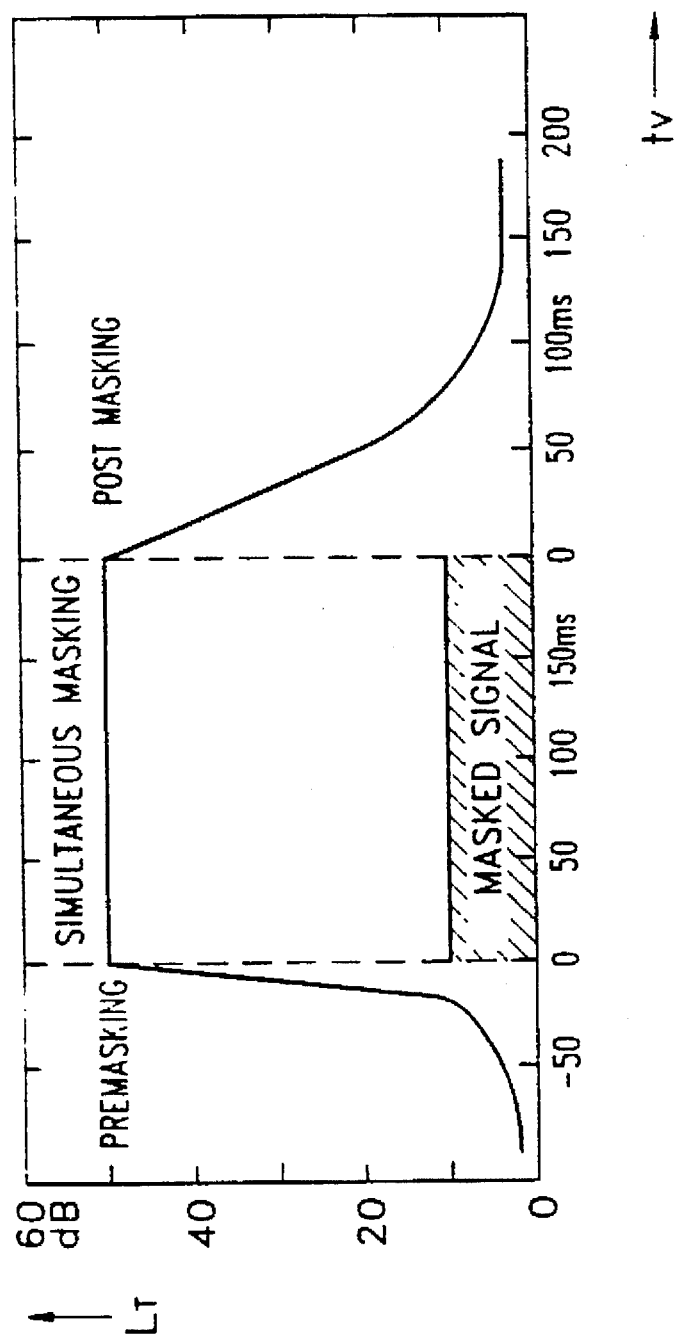
FIG. 2 illustrates the masking effect with respect to time domain.

FIG. 2, in which the X-axis indicates the time domain and the Y-axis indicates masking strength, shows that the masking effect over time can be divided into three areas: pre-masking, simultaneous masking and post-masking. In pre-masking (or backward masking), first, a signal appears and then the signal is masked by a masker (the component causing a masking phenomenon) which follows the signal. The simultaneous masking is generated when the signal and masker occur simultaneously. The post-masking (or forward masking) masks a signal generated after the masker appears.

Figure 3:
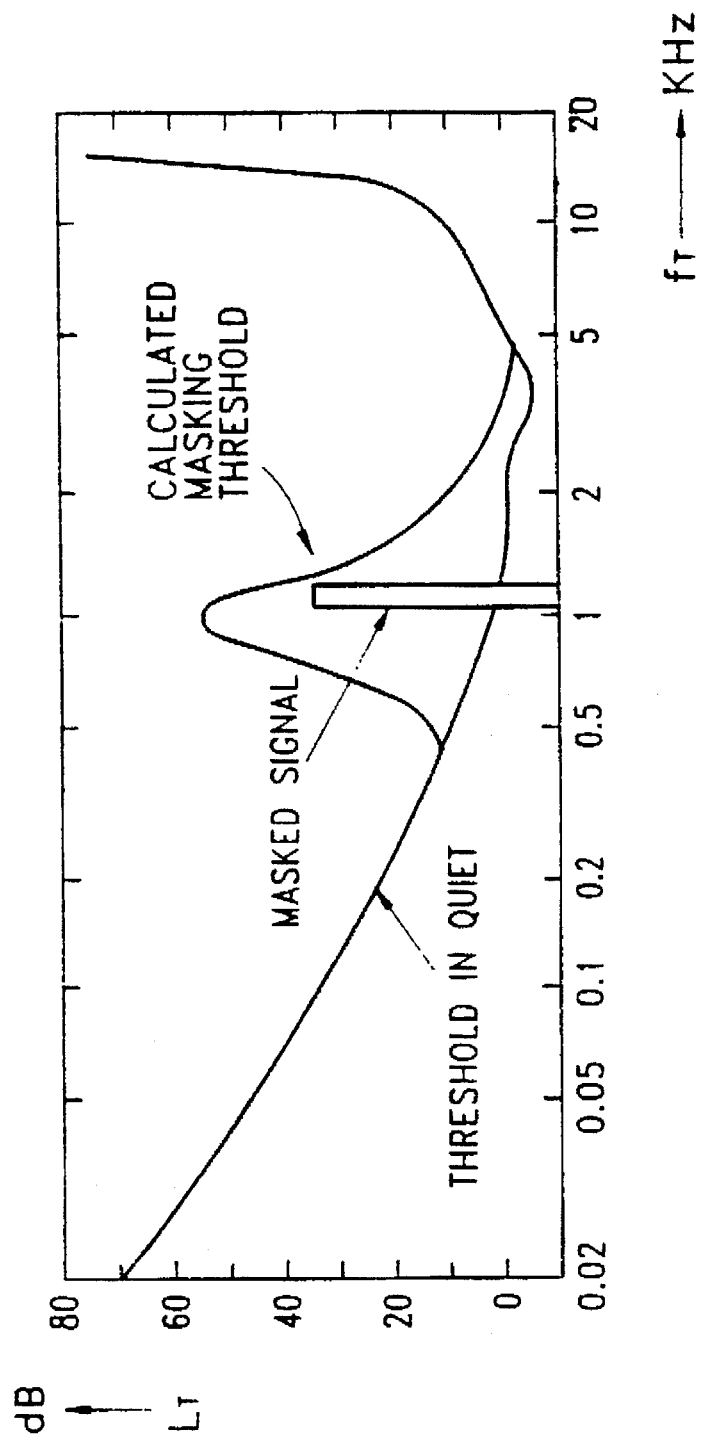
FIG. 3 illustrates an example of a masking threshold varied according to input signal.

FIG. 3 illustrates an example of the masking threshold varied according to input signal, where the X-axis indicates frequency domain and the Y-axis indicates input signal strength. Here, an approximately 1 kHz signal is shown to be masked according to the masking threshold varied with input signal. In the quiet state (without an input signal), the signal will not be masked. (See FIG. 3 showing the masking threshold of a quiet state.) Here, a mask threshold calculation by frequency domain is performed, and the frequency domain is divided into critical bands, as shown in Table 1, so that the signal power in each critical band can be obtained.

TABLE 1

| band No. | center frequency (kHz) | bandwidth (kHz) | lower mask frequency (kHz) | upper mask frequency (kHz) |
| --- | --- | --- | --- | --- |
| 1 | 0.050 | 0.100 | 0.000 | 0.100 |
| 2 | 0.150 | 0.100 | 0.100 | 0.200 |
| 3 | 0.250 | 0.100 | 0.200 | 0.300 |
| 4 | 0.350 | 0.100 | 0.300 | 0.400 |
| 5 | 0.450 | 0.110 | 0.400 | 0.510 |
| 6 | 0.570 | 0.120 | 0.510 | 0.630 |
| 7 | 0.700 | 0.140 | 0.630 | 0.770 |
| 8 | 0.840 | 0.150 | 0.770 | 0.920 |
| 9 | 1.000 | 0.160 | 0.920 | 1.080 |
| 10 | 1.170 | 0.190 | 1.080 | 1.270 |
| 11 | 1.370 | 0.210 | 1.270 | 1.480 |
| 12 | 1.650 | 0.240 | 1.480 | 1.720 |
| 13 | 1.850 | 0.280 | 1.720 | 2.000 |
| 14 | 2.150 | 0.320 | 2.000 | 2.320 |
| 15 | 2.500 | 0.380 | 2.320 | 2.700 |
| 16 | 2.900 | 0.450 | 2.700 | 3.150 |
| 17 | 3.400 | 0.550 | 3.150 | 3.700 |
| 18 | 4.000 | 0.700 | 3.700 | 4.400 |
| 19 | 4.800 | 0.900 | 4.400 | 5.300 |
| 20 | 5.800 | 1.100 | 5.300 | 6.400 |
| 21 | 7.000 | 1.300 | 6.400 | 7.700 |
| 22 | 8.500 | 1.800 | 7.700 | 9.500 |
| 23 | 10.50 | 2.500 | 9.500 | 12.00 |
| 24 | 13.50 | 3.500 | 12.00 | 15.50 |

Assuming that the signal power of a critical band is represented by $S(x)$ and that the spreading function modeling the mask phenomenon of a human auditory organ is represented by $B(x)$, the masking effect in each critical, that is, the varied masked threshold $E(x)$ can be calculated by a linear convolution with respect to $S(x)$ and $B(x)$, as follows.

$$E(x) = S(x) \ast B(x) \quad (1)$$

Here, the spreading function $B(x)$ is expressed as follows.

$$10 \log B(x) = 15.81 + 7.5(x+0.474) - 17.5(1+(x+0.474)^2)^{1/2} \quad (2)$$

Figure 5A:
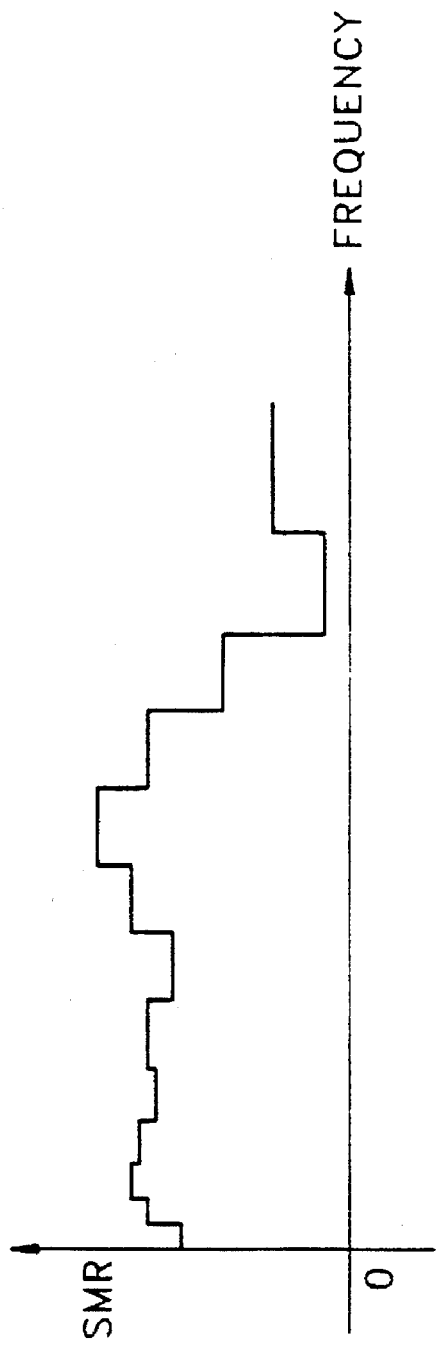
FIGS. 5A and 5B show SMR values before and after offset correction, respectively.
Figure 5B:
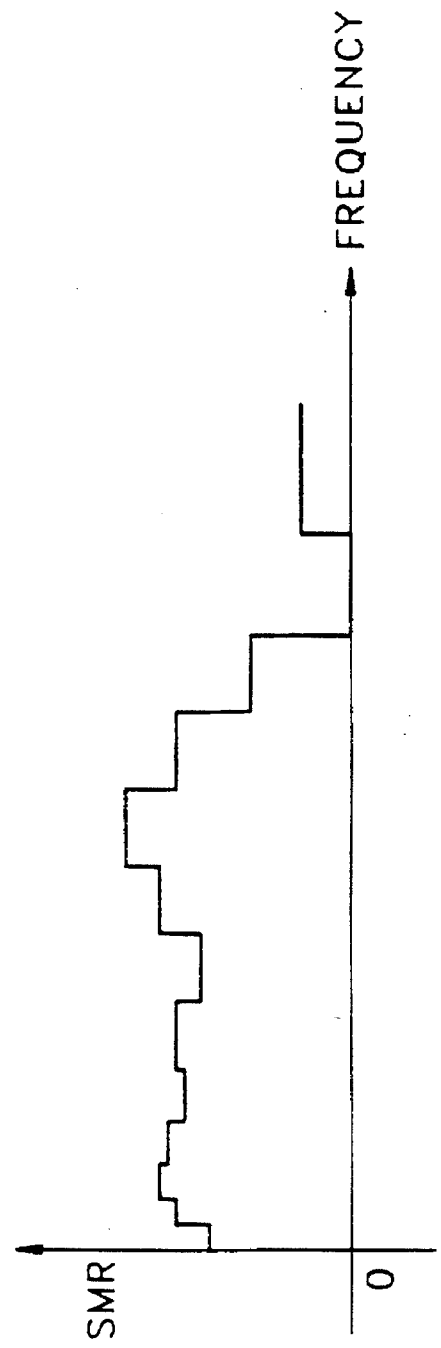

The resultant threshold is the maximum value in each critical band. This is compared with the threshold in a quiet state (absolute threshold), and the higher of the two becomes a final masking threshold. The masking threshold obtained through such a process has a stepped waveform as shown in FIG. 5. From the masking threshold, an SMR value is calculated.

Then, to calculate the NMR value, the SMR value is compared with an error spectrum. The error spectrum is obtained by converting an error signal into a frequency domain grouped according to band, after which the signal power of each critical band is calculated. The above NMR calculation can be expressed as follows.

$$NMR = SMR - SNR \qquad (3)$$

The logarithmic value of the NMR indicates the gap between the error noise and the masking threshold. If the error noise is greater than the threshold, the error noise is audible.

An NMR value greater than zero represents quantization noise which is heard and not completely masked. An example of the case where the error noise may be audible or not audible according to the calculated NMR value is shown in FIG. 4B. Here, the noise between 6 KHz and 12 KHz is audible.

As described above, in the conventional encoding method considering human auditory characteristics, the goal of the bit allocating step is to reduce the quantization noise by choosing the proper number of quantization bits, thereby positioning the error signal below the masking threshold. Also, in the method of allocating the number of quantization bits to the respective critical bands, the reason for locating the largest NMR value, that is, the noise component above the masking threshold, is that since such noise is unpleasant to the ear, many quantization bits are allocated to that portion, which makes the quantization noise small, thereby rendering the noise inaudible.

This above method makes the most of available bits while minimizing the audible error effect. However, the bit allocation step thereof requires one more addition operation, after the relational operations are repeated a certain number of times (the number of bands to be processed minus one), for the allocation of each bit.

Therefore, according to the present invention, there is proposed a method of calculating signal weight in consideration of the input value, which is variable depending on the processing units of quantization bit allocation and the distribution of the minimum input signal amplitude necessary for sensing by the ear, and then, using the calculated weight, allocating quantization bits to an arbitrary critical band in a sequential, non-iterative manner. The bit allocation method reduces operational complexity by considering the SMR value only, instead of using the NMR value. Moreover, the quantization bits are allocated sequentially starting from the higher-frequency critical band, thereby enabling many more bits to be allocated to the lower bands.

The bit allocation method according to the present invention is summarized as follows.

1. SMR values are calculated with respect to all critical bands, and the minimum ($SMR_{min}$) and total ($SMR_{total}$) values thereof are obtained.

2. From these SMR values, a signal weight per band is obtained, which is used for comparing the number of available bits from the highest frequency domain with the necessary number of bits. Then, if the comparison result satisfies a given condition, bits are allocated to the corresponding band.

3. The number of available bits and the SMR values of the remaining critical bands are recalculated and steps 1 and 2 are repeated until all the available bits are allocated.

In step 1, $SMR_{min}$ is obtained in order to perform an offset correction with respect to the SMR value for each band, by subtracting $SMR_{min}$ from the SMR value for each band. Here, offset correction is required for the accuracy in calculating weight and for negative SMR values, and $SMR_{total}$ is also necessary in calculating the weight of each critical band.

With the total number of available bits determined by a data compression ratio, the number of quantization bits allocated to an arbitrary band i is determined by the following formula.

$$BIT_i = BIT_{total} \left( \frac{SMR_i - SMR_{min}}{SMR_{total} - N(SMR_{min})} \right) \qquad (4)$$

Here, $BIT_i$ is the number of quantization bits allocated to an arbitrary critical band, $BIT_{total}$ is the number of quantization bits which can be allocated to the critical bands which are equal to or below the arbitray critical band, $SMR_i$ is the SMR value of an arbitrary critical band, $SMR_{min}$ is the minimum value among SMR values of the critical bands which are equal to or below the arbitray critical band, $SMR_{total}$ is the total SMR value of the critical bands which are equal to or below the arbitray critical band, and N is the number of bands.

Here, a corrected SMR value (the numerator in Equation 4) is obtained from $SMR_{min}$ and divided by the total corrected SMR value (the denominator), to get the calculated weight of critical band i which is offset-corrected. $BIT_{total}$ is allocated in part to the number of available bits $BIT_i$ depending on weight. Then, $BIT_i$ is compared with the number of bits needed for indicating quantization data, which is the sum of bit numbers to be used additionally according to the allocation of quantization bits to the sampled data of an arbitrary critical band, and is the same as a scalefactor plus the minimum number of bits used for quantization. If $BIT_i$ is not enough to represent the quantization data, the number of bits allocated to an arbitrary critical band i becomes zero, which is used in a subsequent operation.

After the number of quantization bits is allocated to a critical band, the weights of SMR values for the remaining critical bands are newly obtained so that the $BIT_{total}$ value, which is varied by the performance of bit allocation, can be used efficiently. A given number of bits is compared with the sum of the SMR values for the remaining bands, which determines the weight of the SMR value for the corresponding band.

In other words, after bit allocation is performed in a critical band, the SMR value of the immediately preceding band is subtracted from SMRotal and from the value of the number of the remaining bands, respectively, which is used to compute weights and thereby enables weight adjustment based on the remaining bands.

$$BIT_{total} = BIT_{total} - BIT_i \qquad (5)$$

Here, when each critical band is processed, in view of the general property of a signal, it should be considered that many signals are distributed in the lower frequency bands and that few signals are distributed in the higher frequency bands. Then, when bits from lower frequency bands begin to be allocated, the scalefactor for higher frequency bands largely having no information therein is also considered in processing each critical band. Thus, at the time of overall bit allocation, it is understood that such a procedure is not an effective way to use a given number of bits, such that bits for the unused scalefactors are used when bits are allocated to higher bands. Therefore, the encoding method according to the present invention adopts the processing order by which higher frequency portions are first processed, thereby eliminating unnecessary portions before encoding, which results in high bit-allocation efficiency.

Here, as shown in the below formula (6), many more bits are set to be allocated to a specific frequency band, by setting the multiplied value of the used number of needed bits ("NEEDBIT") and the weight $W_i$ of each band as a new value $NEEDBIT_{new}$ which is used for comparison.

$$NEEDBIT_{new} = W_i \times NEEDBIT = W_i \times (S + BIT_{min}) \qquad (6)$$

Here, S is the scalefactor.

By making the $W_i$ value small, many more bits can be allocated to the higher bands, which has the same effect of emphasizing the signal of high-frequency component, as in the pre-emphasis adopted for speech processing. That is to say, pre-emphasis can be effectuated by this adjusting of the band weight (the $W_i$ value).

As described above, the encoding method according to the present invention allocates quantization bits sequentially from higher frequency bands to lower frequency bands, thereby enabling to the realization of non-iterative operation, which reduces the numbers of operations. Also, the encoding method according to the present invention operates the number of quantization bits to be allocated, by using the signal-to-mask ratio in allocating quantization bits to a critical band, instead of the noise-to-mask ratio, thereby simplifying operation. Further, since the encoding method according to the present invention can give a characteristic weight to each critical band, it is possible to emphasize a specific band and to perform pre-emphasis.

What is claimed is:

1. A method of encoding an audio signal comprising the steps of:

sampling a time-domain audio signal;

converting said sampled audio signal into a frequency-domain signal divided into a plurality of critical bands;

allocating to each critical band the number of quantization bits allowing the NMR (noise-to-mask ratio) for the corresponding critical band to be minimum;

quantizing a frequency-domain-signal by the allocated number of quantization bits;

wherein in said bit allocating step, quantization bits are allocated according to the weight of critical bands in the order from the critical band having the highest frequency to the one having the lowest frequency and the number of quantization bits allocated to an arbitrary critical band is determined by the weight of said critical band among the critical bands which are equal to or below said critical band.

2. A method of encoding an audio signal as claimed in claim 1, wherein the weight of an arbitrary critical band is determined by the magnitude of the signal-to-masking threshold ratio (SMR) of said arbitrary critical band among the critical bands which are equal to or below said arbitray critical band.

3. A method of encoding an audio signal comprising the steps of:

sampling a time-domain audio signal;

converting said sampled audio signal into a frequency-domain signal divided into a plurality of critical bands;

allocating to each critical band the number of quantization bits allowing the noise-to-mask ratio ("NMR") for the corresponding critical band to be minimum and according to the weight of critical bands in the order from the critical band having the highest frequency to the one having the lowest frequency, wherein the number of quantization bits allocated to an arbitrary critical band is determined by the following formula, in consideration of the magnitude of signal-to-masking threshold ratio (SMR) of said arbitrary critical band among the critical bands which are equal to or below said arbitrary critical band:

$$BIT_i = BIT_{total} \left( \frac{SMR_i - SMR_{min}}{SMR_{total} - N(SMR_{min})} \right)$$

where $BIT_i$ is the number of quantization bits allocated to an arbitrary critical band, $BIT_{total}$ is the number of quantization bits which can be allocated to the critical bands which are equal to or below said arbitrary critical band, $SMR_i$ is the SMR of said arbitrary critical band, $SMR_{min}$ is the minimum SMR among SMRs of the critical bands which are equal to or below said arbitrary critical band, and $SMR_{total}$ is the total of SMRs of the critical bands which are equal to or below said arbitrary critical band, and N is the number of bands; and quantizing a frequency-domain-signal by the allocated number of quantization bits.

4. A method of encoding an audio signal comprising the steps of:

sampling a time-domain audio signal;

converting said sampled audio signal into a frequency-domain signal divided into a plurality of critical bands;

allocating to each critical band the number of quantization bits allowing the NMR for the corresponding critical band to be minimum;

quantizing a frequency-domain-signal by the allocated number of quantization bits;

wherein in said bit allocating step, quantization bits are allocated according to the weight of critical bands in the order from the critical band having the highest frequency to the one having the lowest frequency and the number of quantization bits allocated to an arbitrary critical band is compared with the new number of needed bits ($NEEDBIT_{new}$) determined by the below formula, the number of quantization bits is allocated to the corresponding critical band if said quantization bit number is greater than or equal to the new number of needed bits, and the number of quantization bits is not allocated to the corresponding critical band if said quantization bit number is smaller than the new number of needed bits:

$$NEEDBIT_{new} = W_i \times NEEDBIT = W_i (S + BIT_{min})$$

where $W_i$ is a characteristic weight of each critical band, NEEDBIT is the used number of needed bits, S is the scalefactor, and $BIT_{min}$ is the minimum number of bits used for quantization.

* * * * *

UNITED STATES PATENT AND TRADEMARK OFFICE
CERTIFICATE OF CORRECTION

PATENT     : 5,649,053
DATED      : July 15, 1997
INVENTOR(S): Sang-wook Kim

It is certified that error appears in the above-identified patent and that said Letters Patent is hereby corrected as shown below:

On the title page, item [75] Inventor: the inventor's name should be --Sang-wook Kim--; and after item [22] insert the following:

--[30]   Foreign Application Priority Data

Oct. 30, 1993   [KR]   Rep. of Korea ................93-22958   --.

Signed and Sealed this

Second Day of December, 1997

Attest:

BRUCE LEHMAN

*Attesting Officer*     Commissioner of Patents and Trademarks